(12) United States Patent
Schneider

(10) Patent No.: US 8,239,936 B2
(45) Date of Patent: Aug. 7, 2012

(54) SECURING UNPRIVILEGED SESSIONS ON POSIX SYSTEMS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1088 days.

(21) Appl. No.: 11/985,378

(22) Filed: Nov. 14, 2007

(65) Prior Publication Data

US 2009/0125711 A1     May 14, 2009

(51) Int. Cl.
*G06F 21/00*     (2006.01)
(52) U.S. Cl. .......................... 726/17; 713/164; 713/166
(58) Field of Classification Search ........... 713/164–167
See application file for complete search history.

(56) References Cited

U.S. PATENT DOCUMENTS

2002/0065919 A1* 5/2002 Taylor et al. ................. 709/226
2006/0047797 A1* 3/2006 Brown et al. ................. 709/223

OTHER PUBLICATIONS

Gerhard Mourani; Securing and Optimizing Linux: RedHat Edition; Jun. 7, 2000; Open Network Architecture and OpenDocs Publishing; Version: 1.3: Page count: 468; Pertinent pp. 8, 19, 21, 22, 43, 53, 54, 162, 218, 247-252, 363, and 446-450.*

* cited by examiner

*Primary Examiner* — Gilberto Barron, Jr.
*Assistant Examiner* — Malcolm Cribbs
(74) *Attorney, Agent, or Firm* — Lowenstein Sandler PC

(57) ABSTRACT

A method and apparatus for providing security to Portable Operating System Interface (POSIX) system. In one embodiment, a file system with noexec/nodev options is mounted on the POSIX system. The root directory of the mounted file system is changed with a chroot operation to generate a secured system directory structure. The secured system directory structure is assigned to a non-administrative user.

13 Claims, 5 Drawing Sheets

POSIX OS 102

NOEXEC/NODEV FILE SYSTEM 104

CHROOT FILE SYSTEM 106

SECURING UNPRIVILEGED SESSIONS ON POSIX SYSTEMS

TECHNICAL FIELD

Embodiments of the present invention relate to operating systems, and more particularly, to securing an operating system.

BACKGROUND

One of the biggest threat to an Operating System (OS) does not originated from the outside, but from an internal user. An internal user having privilege access to the OS may compromise its security by intentionally or unintentionally running applications that could subvert the security of the OS.

One solution includes isolating a user in the OS via a virtual environment. However, such user may still be able to manipulate its virtual environment to eventually compromise the security of the entire system by running malicious applications.

DESCRIPTION OF THE DRAWINGS

The present invention is illustrated by way of example, and not by way of limitation, in the figures of the accompanying drawings and in which.

DETAILED DESCRIPTION

Described herein is a method and apparatus for providing security to Portable Operating System Interface (POSIX) system. In one embodiment, a file system is mounted with noexec/nodev options on the POSIX system. A chroot operation is then performed on the mounted file system to generate a secured system directory structure. The secured system directory structure is assigned to a non-administrative user. In another embodiment, a chroot operation is first performed on a file system of a POSIX system. A file system with noexec/nodev options is then mounted on the file system of the POSIX system to generate a secured system directory structure. The secured system directory structure is then assigned to a non-administrative user.

Figure 1:
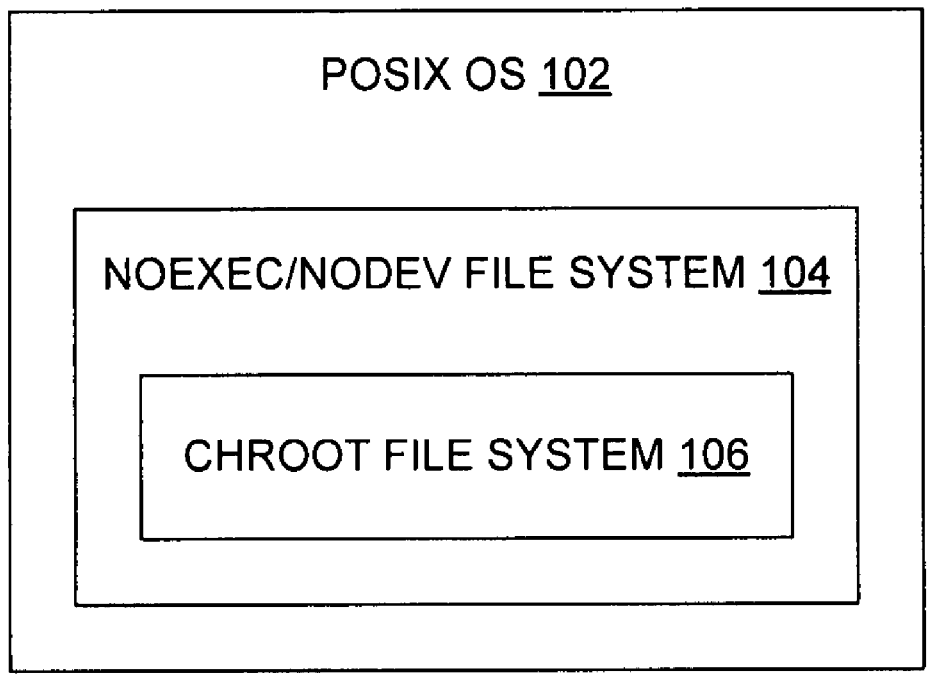
FIG. 1 is a block diagram illustrating one embodiment of a secured POSIX system.

FIG. 1 is a block diagram illustrating one embodiment of a secured POSIX system. A POSIX type OS 102 may be for example, a Unix or Linux system. These operating systems conform to POSIX standards, which define the application programming interface (API) for these operating systems. Two features provide additional security to such POSIX type systems: performing a chroot and mounting a nonexec/nodev file system.

A chroot on POSIX type systems is an operation that changes the apparent disk root directory for the current running process and its children. A program that is re-rooted to another directory cannot access or name files outside that directory, called a chroot jail. The term "chroot" may refer to the chroot(2) system call. In other words, the location of the root directory for a running process is changed so that the process cannot access any files in the remainder of the system.

Programs expect at startup to find scratch space, configuration files, device nodes and shared libraries at certain preset locations. For a chrooted program to successfully start, the chroot directory must be populated with a minimum set of these files.

Programs are allowed to carry open file descriptors (for files, pipelines and network connections) into the chroot, which can simplify jail design by making it unnecessary to leave working files inside the chroot directory. This also works as a simple capability system, in which the program is explicitly granted access to resources outside the chroot based on the descriptors it can carry in.

Another means for providing security to a POSIX type system is to mount a filesystem with noexec/nodev options. Mounting a filesystem noexec/nodev means that no files on the mounted filesystem is to be interpreted as a program or a link to a device driver.

The fstab (for file systems table) file is commonly found on Unix/Linux systems as part of the system configuration. The fstab file typically lists all available disks and disk partitions, and indicates how they are to be initialized or otherwise integrated into the overall system's file system. The fstab file is most commonly used by the mount command, which reads the fstab file to determine which options should be used when mounting the specified device. Traditionally, the fstab was only read by programs, and not written. However, more modern system administration tools can automatically build and edit fstab, or act as graphical editors for it.

The dev/nodev option instructs the POSIX system to interpret/not interpret device special nodes on the filesystem. The exec option lets one execute binaries that are on that partition, whereas noexec option doesn't let one do that. The noexec option might be useful for a partition that contains binaries that one does not want to execute on the system, or that cannot even be executed on the system, for example, in the case of a partition containing a filesystem for a different operating system (such as a Microsoft® Windows™ "C:" drive mounted on a Linux® system).

FIG. 1 illustrates one embodiment where these two features taken together are used to create a highly secure system for a POSIX type system 102 by creating a directory structure 106 that contains the subset of the operating system components (programs, configuration files, libraries, etc.) that the user is allowed to interact with. The user's home directory and the temporary files directory are then put on separate filesystems mounted with nodev/noexec options 104. The system directory structure should be read-only for everyone but for the root user. As such, the filesystem of a chroot operation is subsequently mounted on with nodev/noexec options.

Figure 2:
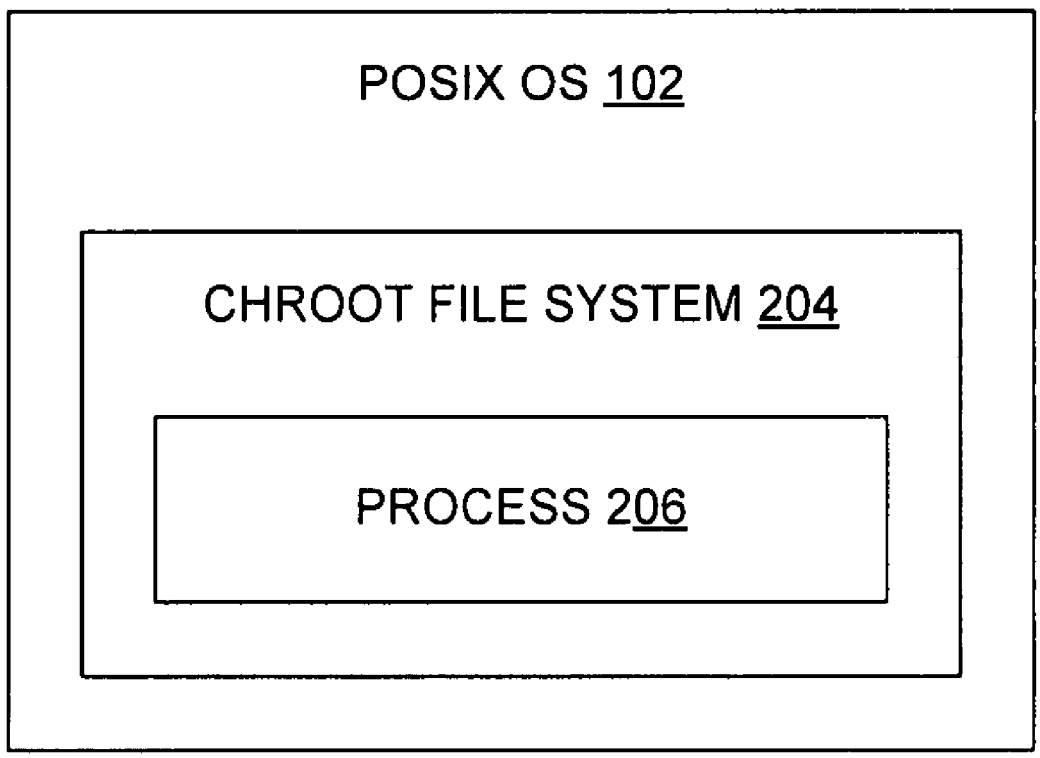
FIG. 2 is a block diagram illustrating another embodiment of a secured POSIX system.

FIG. 2 is a block diagram illustrating another embodiment of a secured POSIX system 102. A filesystem is first mounted with nodev/noexec options 206. A chroot(2) operation 204 is then performed on a running process 206. From the point of view of the process, its root directory is whatever it was set to be by the chroot(2) system call.

In one embodiment, when a user logs in, the login process would obtain the filesystem position of the base of the system subset, mount the user's home directory and a temp directory at the appropriate places with the noexec/nodev options, issue a chroot system call to change the root directory to the base of the system subset, and change the real and effective user and group Ids to match those of the user logging in.

The system subset needs to be carefully designed to ensure that none of the available programs can be used to subvert the system security. Some common utilities (such as the shell and Perl interpreter) may be modified so that user scripts cannot be executed.

Figure 3:
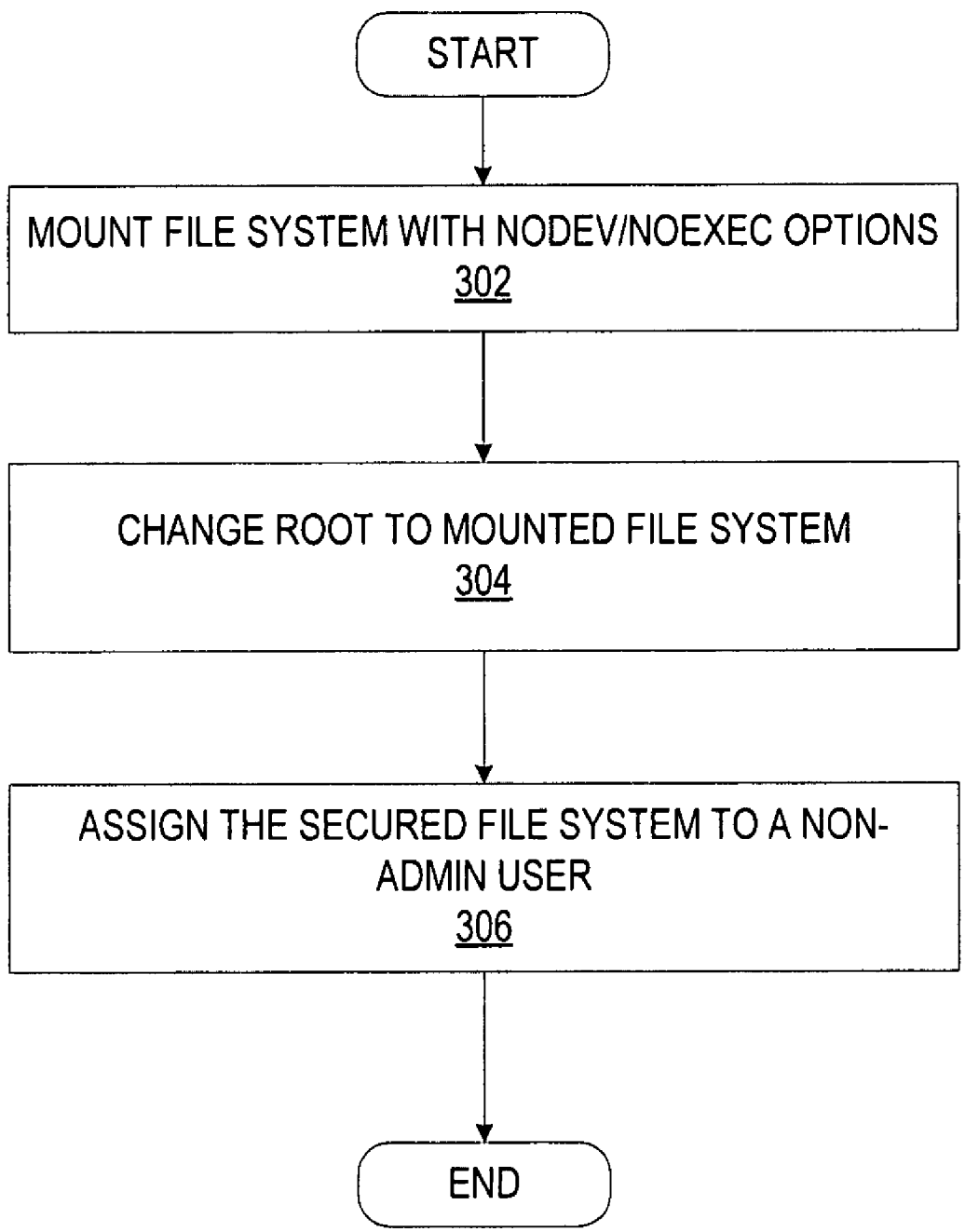
FIG. 3 is a flow diagram of one embodiment of a method for securing a POSIX system.

FIG. 3 is a flow diagram of one embodiment of a method for securing a POSIX system. At 302, a file system with noexec/nodev options is mounted on the POSIX system. At 304, a root directory of the mounted file system is changed with a chroot operation to generate a secured system directory structure. At 306, the secured system directory structure is then assigned to a non-administrative user. In one embodiment, the mounting includes obtaining a filesystem position of the base of a system subset of the POSIX system and mounting the non-administrative user's home directory and a temporary directory with the noexec/nodev options. In one embodiment, changing the root directory includes issuing a chroot system call to change the root directory to the base of the system subset of the POSIX system and changing a user and group ID to match the non-administrative user logging in.

Figure 4:
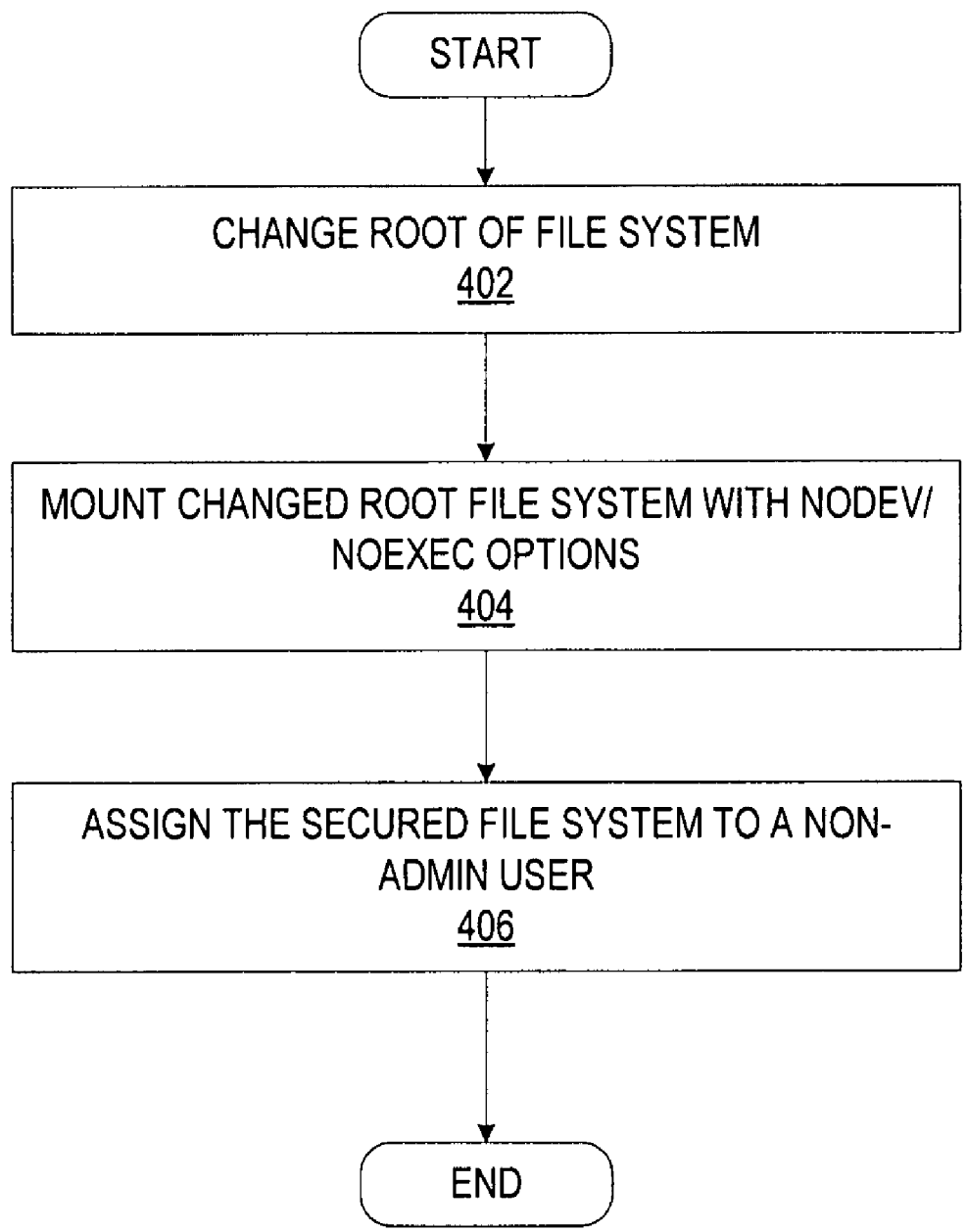
FIG. 4 is a flow diagram of another one embodiment of a method for securing a POSIX system.

FIG. 4 is a flow diagram of another one embodiment of a method for securing a POSIX system. At 402, a root directory of a file system of the POSIX system is changed. At 404, the changed root file system is mounted with noexec/nodev options on the POSIX system. At 406, the secured system directory structure is then assigned to a non-administrative user. In one embodiment, changing the root directory includes issuing a chroot system call to change the root directory to the base of the system subset of the POSIX system and changing a user and group ID to match the non-administrative user logging in. In one embodiment, the mounting includes obtaining a filesystem position of the changed base of the system subset of the POSIX system and mounting the non-administrative user's home directory and a temporary directory with the noexec/nodev options.

Figure 5:
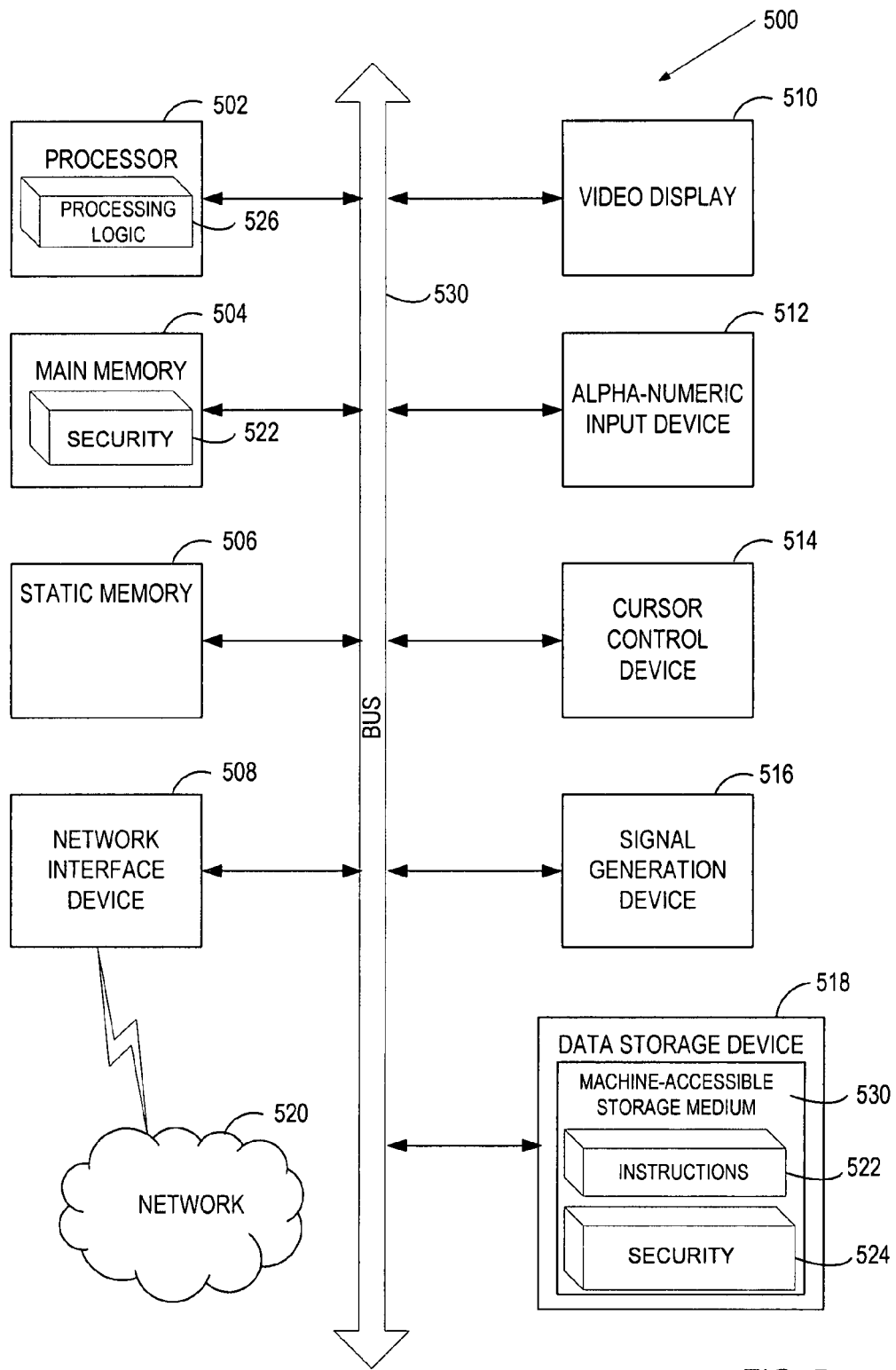
FIG. 5 is a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store a security module 524 for combining chroot operations and mounting a file system with nodev/noexec options. The web browser module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
creating, by a processing device, a changed root file system by changing a root directory on a file system of a Portable Operating System Interface (POSIX) system to a base of a system subset of the POSIX system that is associated with a non-administrative user login;
mounting, by the processing device, the changed root file system with a noexec option and a nodev option to generate a secured system directory structure; and
assigning, by the processing device, the secured system directory structure generated by mounting the changed root file system with the noexec option and the nodev option to a non-administrative user.

2. The method of claim 1 wherein mounting further comprising:
logging in, by the processing device, the non-administrative user;
obtaining, by the processing device, a file system position of the base of the system subset of the POSIX system; and
mounting, by the processing device, the non-administrative user's home directory and a temporary directory with noexec and nodev options.

3. The method of claim 1 wherein creating the changed root file system comprises:
issuing a chroot system call to change the root directory to the base of the system subset of the POSIX system; and
changing a user and group ID to match the non-administrative user logging in.

4. The method of claim 1 wherein the secured system directory structure comprises a subset of components of the POSIX system, the components further comprising programs, configuration files, and libraries.

5. The method of claim 1 wherein the secured system directory structure is read-only but for a root user of the POSIX system.

6. A non-transitory machine-accessible storage medium including data that, when accessed by a machine, cause the machine to perform a method comprising:
creating a changed root file system by changing a root directory of a file system of a Portable Operating System Interface (POSIX) system;
mounting, by the machine, the changed root file system with a noexec option and a nodev option to generate a secured system directory structure; and
assigning the secured system directory structure generated by mounting the changed root file system with the noexec option and the nodev option to a non-administrative user.

7. The non-transitory machine-accessible storage medium of claim 6 further comprising:
logging in the non-administrative user;
obtaining a filesystem position of the base of the system subset of the POSIX system; and
mounting the non-administrative user's home directory and a temporary directory with noexec and nodev options.

8. The non-transitory machine-accessible storage medium of claim 7 wherein creating the changed root file system comprises:
issuing a chroot system call to change the root directory to the base of the system subset of the POSIX system; and
changing a user and group ID to match the non-administrative user logging in.

9. The non-transitory machine-accessible storage medium of claim 6 wherein the secured system directory structure comprises a subset of components of the POSIX system, the components further comprising programs, configuration files, and libraries.

10. The non-transitory machine-accessible storage medium of claim 6 wherein the secured system directory structure is read-only but for a root user of the POSIX system.

11. A computing system comprising:
a memory to store data; and
a processing device coupled to the memory to execute an operating system configured to create a changed root file system by changing a root directory on a file system of a Portable Operating System Interface (POSIX) system to a base of a system subset of the POSIX system that is associated with a non-administrative user login, mount the changed root file system with a noexec option and a nodev option to generate a secured system directory structure, and to assign the secured system directory structure generated by mounting the changed root file system with the noexec option and the nodev option to a non-administrative user.

12. The computing system of claim 11 wherein the operating system is further configured to log in the non-administrative user, to obtain a file system position of the base of the system subset of the POSIX system, and to mount the non-administrative user's home directory and a temporary directory with noexec and nodev options.

13. The computing system of claim 12 wherein the operating system is further configured to issue a chroot system call to change the root directory to the base of the system subset of the POSIX system, and to change a user and group ID to match the non-administrative user logging in.

* * * * *